United States Patent
Jeon

(12) 
(10) Patent No.: US 6,487,501 B1
(45) Date of Patent: Nov. 26, 2002

(54) SYSTEM FOR PREVENTING LANE DEVIATION OF VEHICLE AND CONTROL METHOD THEREOF

(75) Inventor: Yong-Won Jeon, Seoul (KR)

(73) Assignee: Hyundai Motor Company, Seoul (KP)

( * ) Notice: Subject to any disclaimer, the term of this patent is extended or adjusted under 35 U.S.C. 154(b) by 0 days.

(21) Appl. No.: 10/028,691

(22) Filed: Dec. 28, 2001

(30) Foreign Application Priority Data

Jun. 12, 2001 (KR) .............................. 01-32815

(51) Int. Cl.[7] .......................... B60Q 1/00; G05D 1/00; G06F 19/00; G06F 17/00
(52) U.S. Cl. .......................... 701/301; 701/23; 701/24; 701/28; 701/41; 701/300; 701/301; 180/168; 180/443; 180/167; 180/446; 180/169; 702/167; 702/157; 340/903; 340/988; 340/438; 340/436; 340/439
(58) Field of Search .............................. 701/41, 24, 23, 701/28, 301, 300; 702/167, 157; 180/168, 443, 167, 446, 169; 340/903, 988, 438, 436, 439

(56) References Cited

U.S. PATENT DOCUMENTS

| | | | | |
|---|---|---|---|---|
| 4,727,492 A | * | 2/1988 | Reeve et al. | 180/169 |
| 5,373,911 A | * | 12/1994 | Yasui | 180/168 |
| 5,765,116 A | * | 6/1998 | Wilson-Jones et al. | 180/168 |
| 5,926,117 A | * | 7/1999 | Gunji et al. | 340/988 |
| 6,134,509 A | * | 10/2000 | Furusho et al. | 701/28 |
| 6,169,940 B1 | * | 1/2001 | Jitsukata et al. | 340/903 |
| 6,308,123 B1 | * | 10/2001 | Ikegaya et al. | 180/422 |
| 6,324,452 B1 | * | 11/2001 | Ikegaya | 180/422 |
| 6,405,132 B1 | * | 6/2002 | Breed et al. | 701/117 |
| 2002/0007239 A1 | * | 1/2002 | Matsumoto et al. | 701/41 |
| 2002/0013647 A1 | * | 1/2002 | Kawazoe et al. | 701/41 |
| 2002/0041229 A1 | * | 4/2002 | Satoh et al. | 340/438 |

* cited by examiner

Primary Examiner—William A. Cuchlinski, Jr.
Assistant Examiner—Ronnie Mancho
(74) Attorney, Agent, or Firm—Antonelli, Terry, Stout & Kraus, LLP

(57) ABSTRACT

A system for preventing lane deviation of a vehicle and a control method thereof are provided, in which control is performed to prevent the vehicle from inadvertently deviating from a lane. The system comprises a detector including a lane marker detector for detector lane markers that define a lane in the road, and a lane marker ECU for determining a transverse position of the vehicle using signals of the lane marker detector; a controller for determining if the vehicle is deviating from the lane by receiving information transmitted by the detector, determining steering control angle and steering control time according to a vehicle speed and a heading angle at the instant the vehicle is deviating from the lane, and outputting control signals following lane deviation prevention such that an automatic drive mode is realized until the vehicle reaches a center of the lane; and a steering driver controlled by the control signals output from the controller.

14 Claims, 6 Drawing Sheets

SYSTEM FOR PREVENTING LANE DEVIATION OF VEHICLE AND CONTROL METHOD THEREOF

BACKGROUND OF THE INVENTION (a) Field of the Invention

The present invention relates to a system for preventing lane deviation of a vehicle and a control method thereof, and more particularly to a system for preventing deviation from a lane by a vehicle and a control method thereof, in which the driver is alerted when the vehicle inadvertently deviates from a lane.

(b) Description of the Related Art

Various technologies are continuously being developed for vehicles to improve safety and driving convenience. One such technology is a system for preventing deviation from a lane. That is, if the vehicle undergoes inadvertent deviation from a lane as a result of driver carelessness, drowsiness, etc., the system either warns the driver or performs control to correct the positioning of the vehicle. In more detail, the lane deviation prevention system determines the location of the lane markers defining the lane the vehicle is traveling in, then determines the location of the vehicle relative to the lane markers. If the vehicle is deviating from the lane, either the driver is warned or a steering actuator is operated to make corrections in the position of the vehicle.

The main elements of a vehicle lane deviation system (in the case where steering control is provided) are a photographing unit for obtaining photographs of the road on which a vehicle is traveling, an image processor for extracting positions of the lane markers and of the vehicle relative to the lane markers from the photographs, a steering controller for generating instructions as needed to make corrections in the position of the vehicle, and a steering actuator that is driven to adjust the steering of the vehicle according to the steering instructions generated by the steering controller. A CCD (charge coupled device) camera is generally used in the conventional lane deviation prevention system, and the actuator is typically a motor mounted in the steering column. The conventional lane deviation prevention system, therefore, is designed with the concept of assisting the driver, that is, of providing a degree of correctional control.

However, since in an image processing procedure of the conventional system algorithms are derived based on edges in the images to extract the lane markers, it is difficult to overcome the problem of noise in the image data. Also, a substantial amount of time is used in such an image processing procedure.

In addition to the image processing methods in which edges of the images are used, there is disclosed a method in which brightness levels in the images are used to extract lane markers. However, this method is error prone and performance easily varies with changes in the brightness of the images. That is, objects in the road may be mistaken for lane markers, and vehicle lane extraction proves difficult at night, on cloudy days, or other instances in which a peripheral brightness is low.

Also, since conventional systems are designed with the concept of providing a degree of correctional control as described above, the bulk of the re-positioning of the vehicle back between the lane markers during deviation must be performed manually by the driver. Therefore, there are not provided any countermeasures for the degree of control needed during more urgent situations.

SUMMARY OF THE INVENTION

The present invention has been made in an effort to solve the above problems.

It is an object of the present invention to provide a system for preventing lane deviation of a vehicle and a control method thereof, in which control is performed to prevent the vehicle from inadvertently deviating from a lane.

To achieve the above object, the present invention provides a system for preventing lane deviation of a vehicle and a control method thereof. The system comprises a detector including a lane marker detector for detecting lane markers that define a lane in a road, and a lane marker ECU for determining a transverse position of the vehicle using signals of the lane marker detector; a controller for determining if the vehicle is deviating from the lane by receiving information transmitted by the detector, determining steering control angle and steering control time according to a vehicle speed and a heading angle at the instant the vehicle is deviating from the lane, and outputting control signals following lane deviation prevention such that an automatic drive mode is realized until the vehicle reaches a center of the lane; and a steering driver controlled by the control signals output from the controller.

The lane marker detector is a magnetic sensor that detects magnetic nails installed in lane markers of the road.

Preferably, the controller comprises a communications unit for receiving information from the detector; an input data processor for processing information of various sensors and a steering torque sensor, and the transverse position received from the lane marker detector; a lane deviation determining unit for determining whether the vehicle is deviating from the lane using information transmitted from the input data processor; a fuzzy logic controller for calculating an amount of steering control according to information transmitted from the lane deviation determining unit; a steering angle instruction generator for generating a steering angle profile for controlling steering after the amount of steering control is determined by the fuzzy logic controller; a feedback control unit for generating a path for automatic driving following prevention of lane deviation; and an output data processor for outputting information received from the steering angle instruction generator and the feedback control unit.

The controller further comprises an initializing unit and a fail-safe unit.

In the method for preventing lane deviation of a vehicle, if it is determined that the vehicle is deviating from a lane using information of a transverse position of the vehicle, a steering control angle and a steering control time are determined using fuzzy logic according to a vehicle speed and a heading angle at an instant the vehicle deviates from the lane, thereby preventing lane deviation, after which feedback control of the transverse position of the vehicle is performed through a control variable and output as a steering angle such that the vehicle is positioned at a center of the lane in an automatic drive mode according to a given path, and controlling an actuator of an EPS system using the output.

The method comprises initializing variables and functions of a main ECU; checking information of a lane marker ECU and transmitting the information to an input data processor for processing of the information; determining driver intent to discontinue lane deviation prevention and determining whether lane deviation control is able to be performed; performing fail-safe control to determine whether a system for preventing lane deviation is malfunctioning in the case where there is no driver intent to discontinue lane deviation control and the vehicle is traveling in an area such that lane deviation control is able to be performed; determining if the vehicle is deviating from the lane based on information converted in an input data processor to suit an algorithm, in the case where it is determined that the system is operating normally; calculating an amount of steering control suitable to lane deviation conditions to generate a steering angle profile, in the case where it is determined that the vehicle is undergoing lane deviation; calculating a steering angle to return the vehicle to a center of the lane; and transmitting steering control data and steering angle data to an EPS system to realize steering control.

Here, processing of information by the input data processor includes conversion of input values of various sensors, a steering torque sensor, and of a transverse position of the vehicle.

The driver intent is preferably determined according to whether control switches have been operated, a brake pedal has been depressed, a steering wheel operated, and whether the vehicle is traveling in a no-service zone.

The fail-safe control is performed by determining if a control steering angle is normal and determining if a present vehicle speed is less than or equal to a predetermined vehicle speed.

The determination of whether the vehicle is deviating from the lane is performed by calculating a deviation prediction value according to vehicle speed using a transverse position of the vehicle and a heading angle value, which is the derivative of the transverse position.

The prediction value (p_offset) is obtained by offset_f+ Kw*slope_f, where offset_f is the transverse position of the vehicle, slope_f is the derivative of offset_f, and Kw is a gain, which varies according to vehicle speed, and if the p_offset value is greater than one of a predetermined deviation position value OFF_L(left) and a predetermined position value OFF_R(right), it is determined that the vehicle is deviating from the lane.

The amount of steering control suitable to lane deviation conditions is calculated from inputs of vehicle speed and heading angle (slope_f) at the instant the deviation prediction value (p_offset) exceeds the predetermined deviation position value (OFF_L).

The steering angle profile is realized through a triangular waveform.

The steering angle is obtained from Kp * (offset_f− path)+Kd*slope_f, where Kp is P gain, Kd is D gain, offset_f is a transverse position of the vehicle, slope_f is a heading angle, and path is a desired path.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
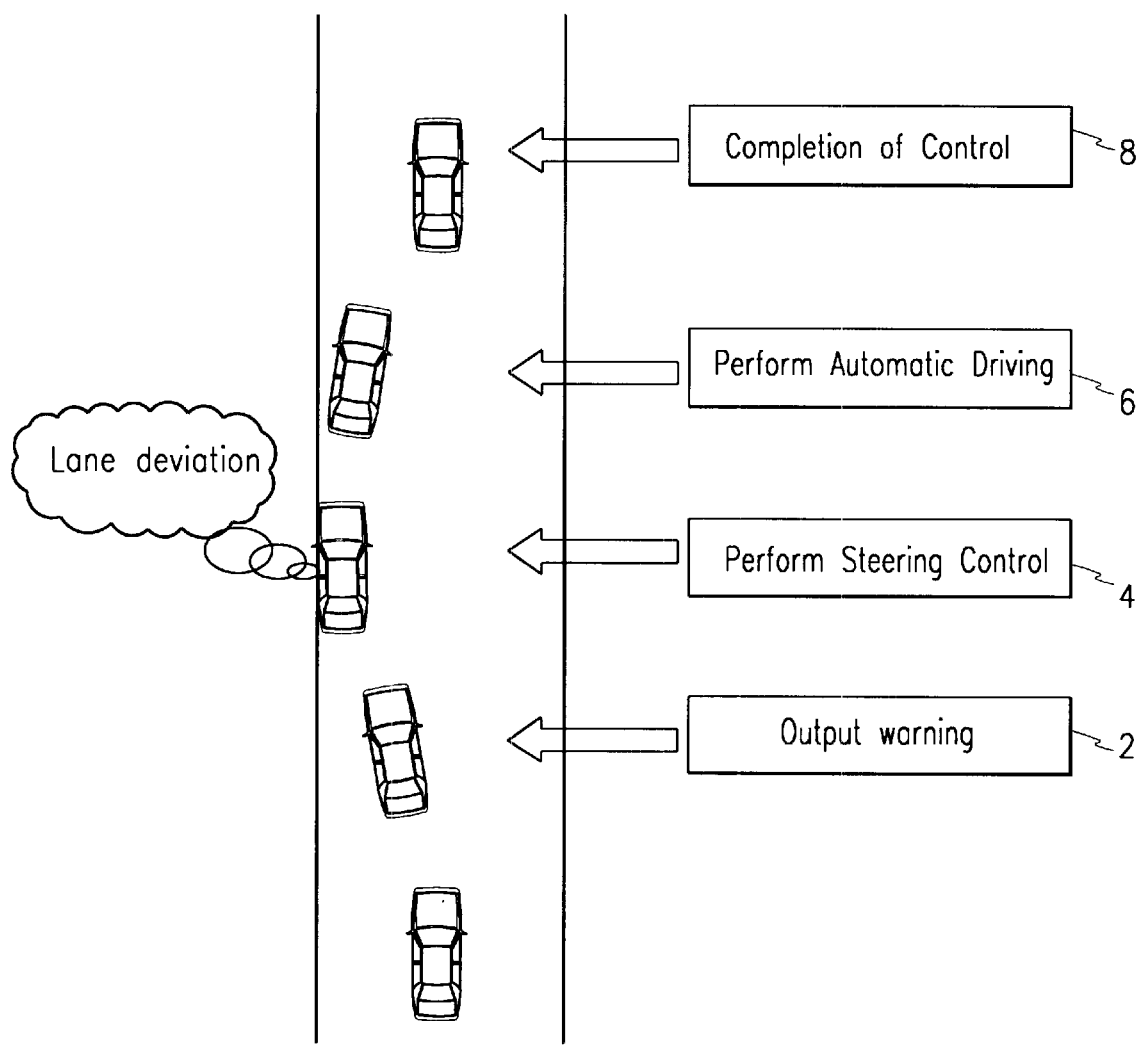
FIG. 1 is a drawing used to describe general processes involved in lane deviation prevention according to a preferred embodiment of the present invention.

FIG. 1 is a drawing used to describe general processes involved in lane deviation prevention according to a preferred embodiment of the present invention.

If a vehicle deviates from a lane, a warning is output (2) and steering control is performed after calculation of a steering angle (4). Subsequently, automatic driving is realized until the vehicle returns to a center between the lane markers (6), at which time control is completed (8).

Figure 2:
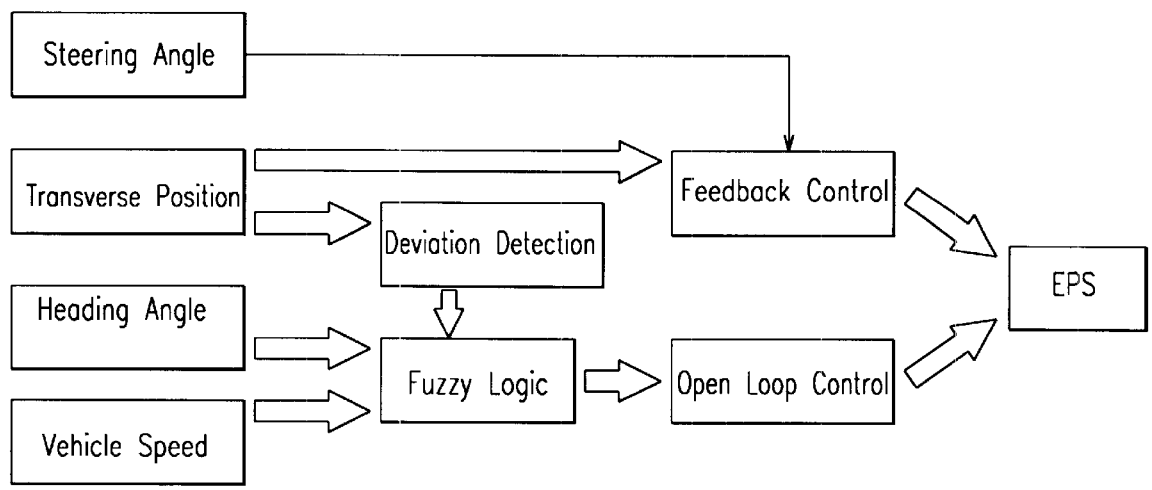
FIG. 2 is a drawing showing the flow of operations in an algorithm used in a system for preventing lane deviation of a vehicle according to a preferred embodiment of the present invention.
Figure 3:
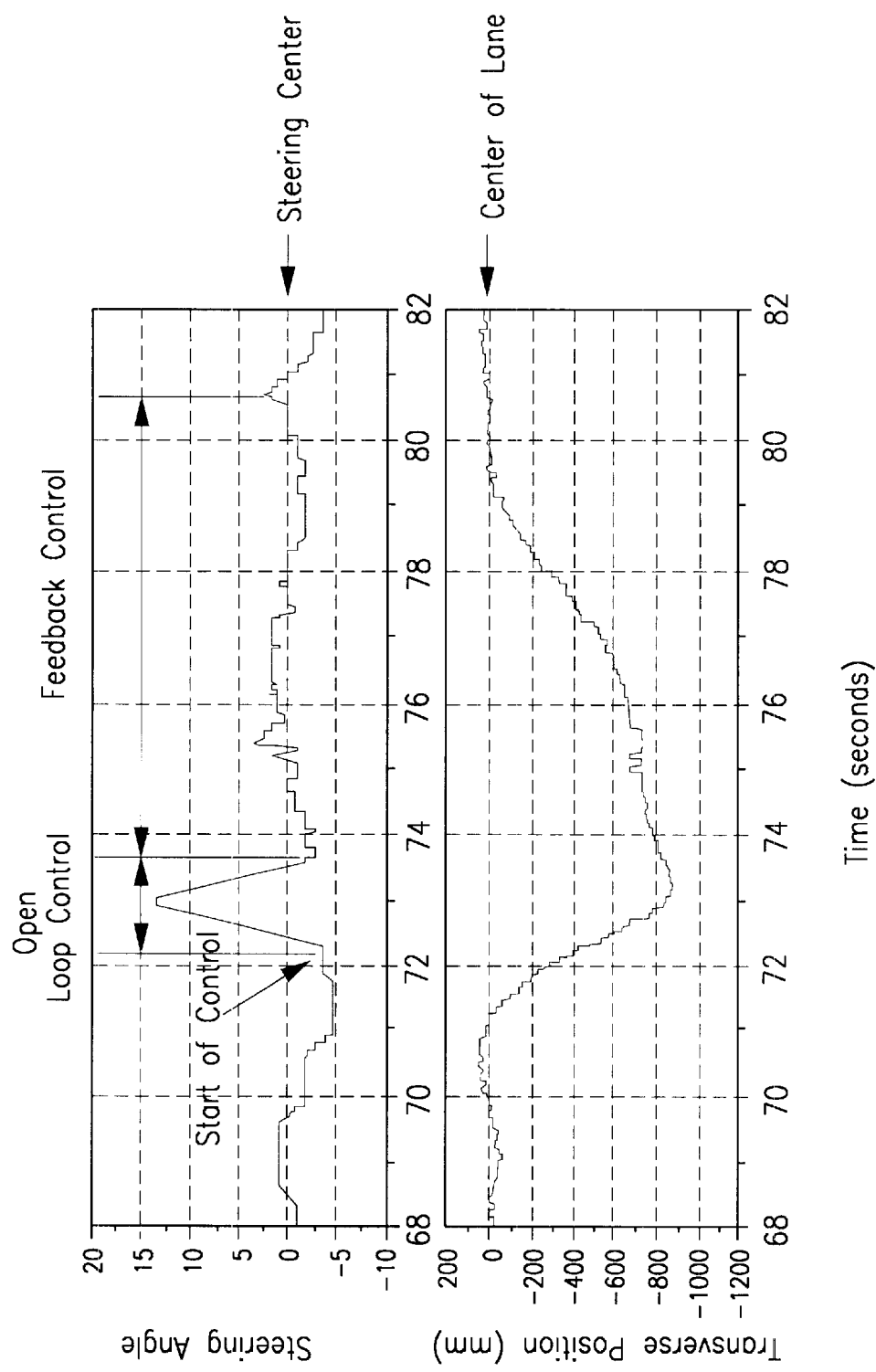
FIG. 3 is a graph showing the relation between a vehicle position and a steering angle in a system for preventing lane deviation of a vehicle according to a preferred embodiment of the present invention.

FIG. 2 is a drawing showing the flow of operations in an algorithm used in a system for preventing lane deviation of a vehicle according to a preferred embodiment of the present invention. With reference to FIGS. 2 and 3, there are two main types of control in the present invention.

Open-loop control is one of the main types of control. In open-loop control, a steering control angle and a control signal are determined according to a vehicle speed and a heading angle at the instant the vehicle experiences lane deviation. An algorithm used at this time is based on fuzzy logic, and open-loop control is realized according to a steering angle profile generated using this algorithm. Control variables become a size (angle) of the profile, and a given profile varies according to deviation conditions.

The second of the two types of control is feedback control. In feedback control, following the prevention of lane deviation using suitable open-loop control, control into an automatic drive mode is performed in which a given path is followed until the vehicle is at a center between the lane markers. An algorithm used at this time is a feedback control algorithm, and a control variable becomes a transverse position of the vehicle and control output becomes a steering angle. The path used to control the vehicle to the center of the lane markers is a line that connects the center of the lane markers to a position of the vehicle at the instant feedback control starts. When the path of the vehicle corresponds to a center line between the lane markers, control is discontinued.

Figure 4:
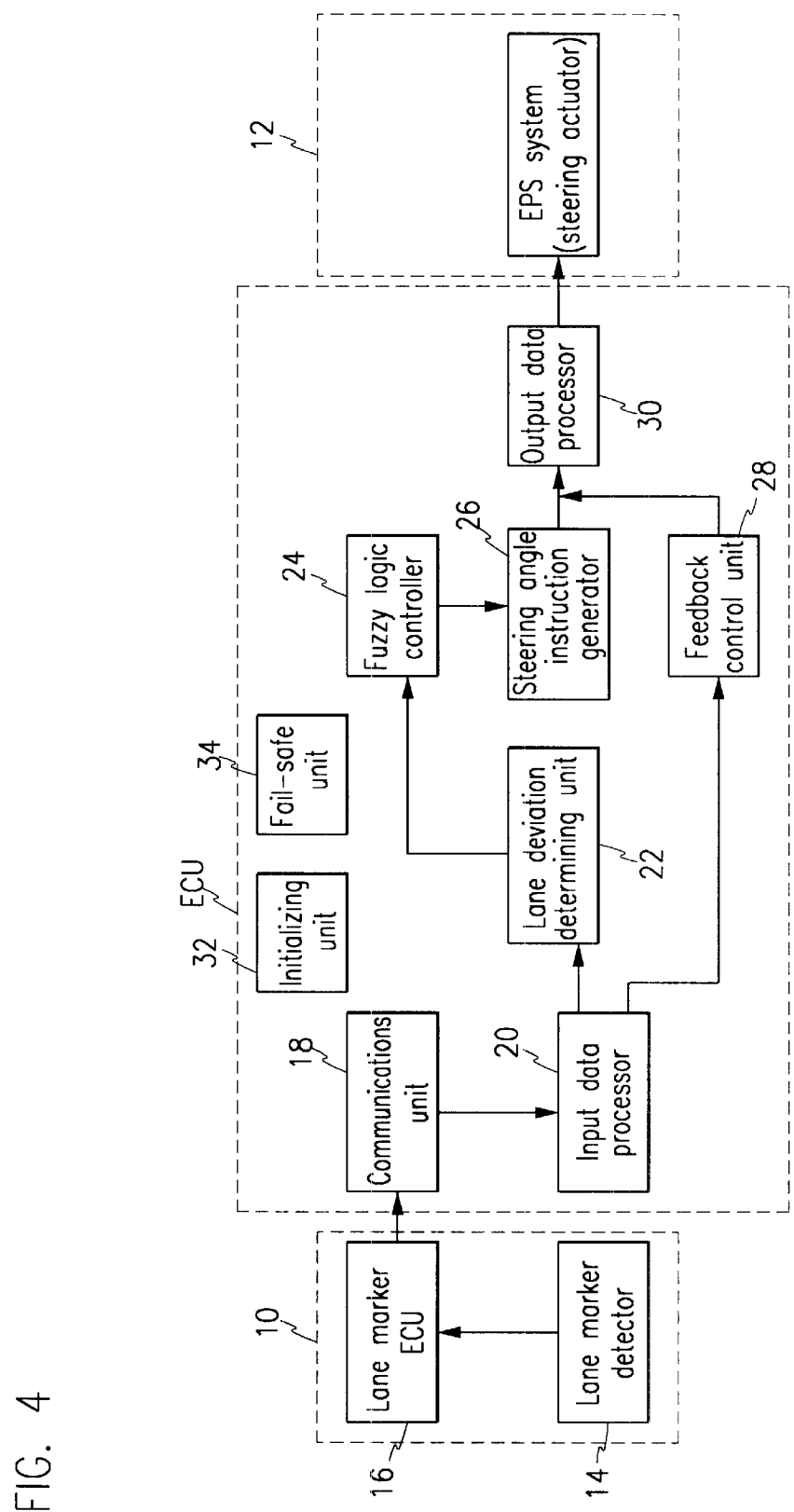
FIG. 4 is a block diagram of a system for preventing lane deviation of a vehicle according to a preferred embodiment of the present invention.

FIG. 4 is a block diagram of a system for preventing lane deviation of a vehicle according to a preferred embodiment of the present invention.

The system includes a detector 10, a main ECU that uses signals received from the detector 10 for making various determinations and performing various controls, and a steering driver 12 that is controlled according to signals output by the main ECU. The detector 10 includes a lane marker detector 14 and a lane marker ECU 16. The lane marker detector 14 is realized through a magnetic sensor that detects magnetic nails installed in lane markers of the road, and the lane marker ECU 16 determines a present transverse position of the vehicle using information received from the lane marker detector 14.

The main ECU includes a communications unit 18, an input data processor 20, a lane deviation determining unit 22, a fuzzy logic controller 24, a steering angle instruction generator 26, a feedback control unit 28, an output data processor 30, an initializing unit 32, and a fail-safe unit 34. The communications unit 18 performs serial communications with the lane marker ECU 16 of the detector 10, and extracts position information by an interrupt method and transmits this information to the input data processor 20.

The input data processor 20 performs processing of input values of various vehicle sensors, a steering torque sensor, and of the vehicle transverse position. If noise is present in any of the signals, the input data processor 20 performs low-pass filtering of the signals, and performs conversion to achieve suitability to an algorithm.

The lane deviation determining unit 22 calculates a deviation prediction value according to vehicle speed from the transverse position of the vehicle and a heading angle, which is obtained by differentiating the transverse position. The lane deviation determining unit 22 then determines whether the vehicle is deviating from the lane using the deviation prediction value. An amount of predicted deviation (p_offset) is obtained from offset_f+Kw*slope_f, where offset_f is the transverse position of the vehicle, slope_f is the derivative of offset_f, and Kw is gain, which varies according to vehicle speed. If the p offset value is greater than predetermined deviation position values OFF_L(left) or OFF_R(right), it is determined that the vehicle is deviating from the lane.

The fuzzy logic controller 24 of the main ECU determines a suitable amount of steering control using a vehicle speed and the heading angle slope_f at the instant the deviation prediction value p_offset exceeds either of the deviation position values OFF_L or OFF_R. Rules used in fuzzy logic are made based on data obtained through experimentation, in which deviation conditions are extracted by the data.

Figure 5:
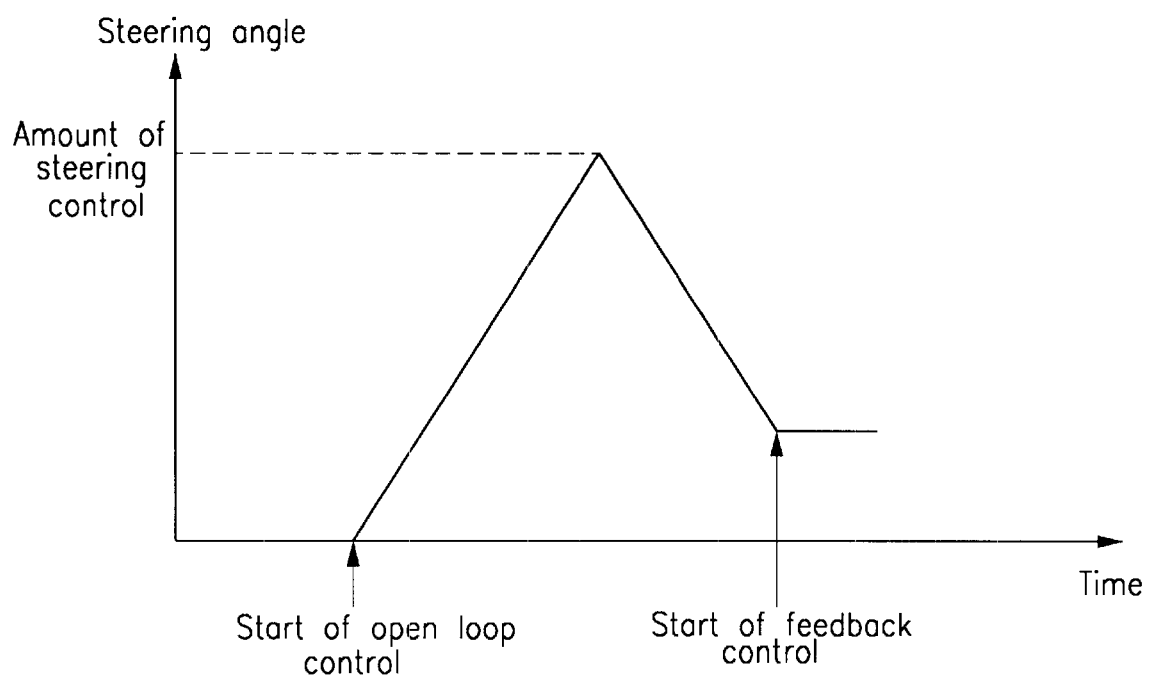
FIG. 5 is a graph showing changes in a steering angle with respect to time.

If an amount of steering control suitable to deviation conditions is determined using fuzzy logic, the steering angle instruction generator 26 generates a desired steering angle profile. A steering angle profile in a triangular waveform is used as shown in FIG. 5.

If lane deviation is prevented using the open-loop control, the feedback control unit 28 generates a path to a center of the lane to return the vehicle to this position, then performs control to enable automatic driving following this path. A steering angle according to feedback control is obtained from Kp* (offset_f−path)+Kd*slope_f, where Kp is P gain, Kd is D gain, offset_f is a transverse position of the vehicle, slope_f is a heading angle, and path is a desired path.

The output data processor 30 performs low-pass filtering of a desired to steering angle, obtained as described above, then transmits the result to the steering driver 12 via communications. The steering driver 12 is realized through an ECU of an EPS (electronic power steering) system. If the above desired steering angle is input to the ECU of the EPS system, the ECU of the EPS system operates a steering actuator such that the vehicle is controlled to a desired location. That is, the steering actuator is operated such that lane deviation is prevented.

Further, the initializing unit 32 performs initialization of the main ECU and of the system. In ECU initialization, variables and functions are initialized, while system initialization is not performed until the vehicle is stably traveling between the lane markers. The fail-safe unit 34 performs discontinuation of control, or determines if irregular control is being performed. Discontinuation of control is performed if control switches are off, the driver depresses the brake pedal, there is driver intent to control steering, or if the vehicle is traveling in a no-service zone (where there are no lane markers). Further, the determination of irregular control is made if a control steering angle according to vehicle speed is an abnormal value or if the vehicle speed is below a predetermined level.

Figure 6:
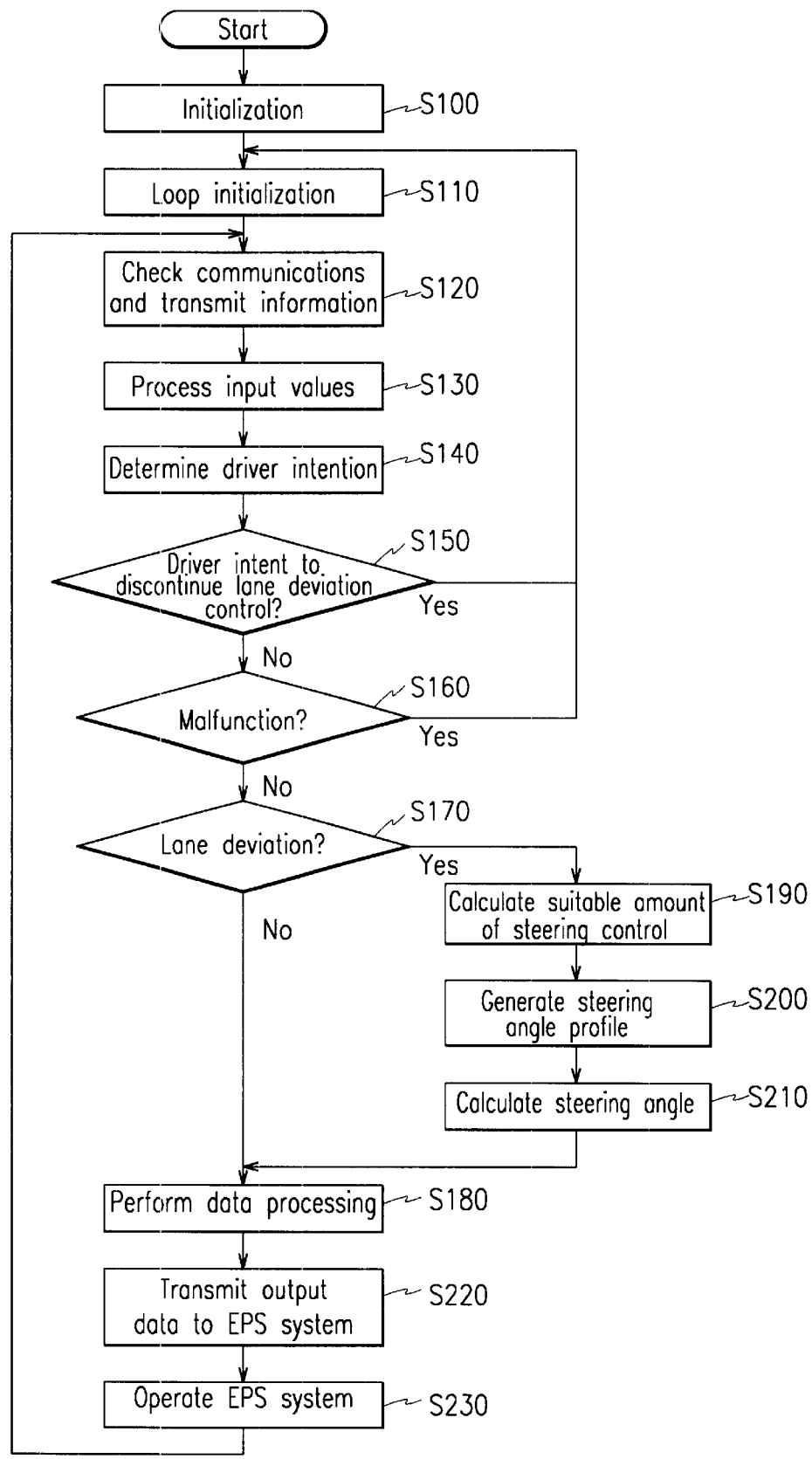
FIG. 6 is a flow chart of a method for controlling the system of FIG. 4 according to a preferred embodiment of the present invention.

FIG. 6 is a flow chart of a method for controlling the system of the present invention described above.

With the start of control, the initializing unit 32 of the main ECU initializes variables and functions in step S100, and performs loop initialization in step S110. Next, the communications unit 18 determines whether information of a present transverse position of the vehicle is being input from the lane marker ECU 16 and transmits this information to the input data processor 20 in step S120.

The input data processor 20 then performs processing of input values of various vehicle sensors, a steering torque sensor, and of the vehicle transverse position in step S130. The input data processor 20 then determines driver intention and whether lane deviation control can be performed in step S140. That is, the input data processor 20 determines whether control switches have been operated, the brake pedal depressed, the steering wheel operated, or whether the vehicle is traveling in a no-service zone.

Based on these determinations, it is then determined whether there is driver intent to discontinue lane deviation control or whether lane deviation control is unable to be performed (i.e., in the case of a no-service zone) in step S150. If there is driver intent to discontinue lane deviation control or if lane deviation control is unable to be performed, the process is returned to step S110 of loop initialization. However, if there is no driver intent to discontinue lane deviation control and the vehicle is traveling in an area such that lane deviation control is able to be performed, fail-safe control is performed in step S160.

That is, in step Si 60, from determinations of whether a control steering angle according to vehicle speed is normal or of whether the vehicle speed is less than or equal to a predetermined speed, if it is determined that there is a malfunction, the process is returned to step S110. However, if the vehicle is operating normally, it is determined if the vehicle is deviating from the lane in step S170.

In more detail, a deviation prediction value is calculated according to the transverse position of the vehicle and a heading angle value, which is the derivative of the transverse position, and it is determined whether the vehicle is deviating from the lane using the deviation prediction value. If it is determined that the vehicle is not deviating from the lane, the output data processor 30 performs data processing in step S180. However, if it is determined that the vehicle is deviating from the lane, the fuzzy logic controller 24 calculates a suitable amount of steering control using inputs of vehicle speed and heading angle at the instant the deviation prediction value exceeds a predetermined deviation position value in step S190.

After the determination of an amount of steering control suitable to deviation conditions of step S190, the steering angle instruction generator 26 generates a desired steering angle profile in step S200. Next, in order to return the vehicle to the center of the lane, the feedback control unit 28 calculates a steering angle to enable automatic driving to the lane center in step S210, after which the output data processor 30 performs data processing of step S180.

Following step S180, output data is transmitted to the steering driver 12 (i.e., the EPS system) in step S220. The EPS system is then operated by the transmitted data in step S230 such that vehicle lane deviation is prevented. The process is returned to step S120 after step S230 of preventing lane deviation, and the above-described operations are continuously repeated.

In the system for preventing lane deviation of a vehicle and control method thereof of the present invention, lane deviation is prevented by controlling an EPS system in the case where the vehicle inadvertently deviates from the lane. Further, automatic driving is realized until the vehicle is returned to the center of the lane. As a result, the present invention provides increased safety for vehicles.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for preventing lane deviation of a vehicle comprising:
    a detector including a lane marker detector for detecting lane markers that define a lane in a road, and a lane marker ECU for determining a transverse position of the vehicle using signals of the lane marker detector;
    a controller for determining if the vehicle is deviating from the lane by receiving information transmitted by the detector, determining steering control angle and steering control time according to a vehicle speed and a heading angle at the instant the vehicle is deviating from the lane, and outputting control signals following lane deviation prevention such that an automatic drive mode is realized until the vehicle reaches a center of the lane; and
    a steering driver controlled by the control signals output from the controller.

2. The system of claim 1 wherein the lane marker detector is a magnetic sensor that detects magnetic nails installed in lane markers of the road.

3. The system of claim 1 wherein the controller comprises:
    a communications unit for receiving information from the detector;
    an input data processor for processing information of various sensors and a steering torque sensor, and the transverse position of the vehicle received from the detector;
    a lane deviation determining unit for determining whether the vehicle is deviating from the lane using information transmitted from the input data processor;
    a fuzzy logic controller for calculating an amount of steering control according to information transmitted from the lane deviation determining unit;
    a steering angle instruction generator for generating a steering angle profile for controlling steering after the amount of steering control is determined by the fuzzy logic controller;
    a feedback control unit for generating a path for automatic driving following prevention of lane deviation; and
    an output data processor for outputting information received from the steering angle instruction generator and the feedback control unit.

4. The system of claim 3 wherein the controller further comprises an initializing unit and a fail-safe unit.

5. A method for preventing lane deviation of a vehicle, in which if it is determined that the vehicle is deviating from a lane using information of a transverse position of the vehicle, a steering control angle and a steering control time are determined using fuzzy logic according to a vehicle speed and a heading angle at an instant the vehicle deviates from the lane, thereby preventing lane deviation, after which feedback control of the transverse position of the vehicle is performed through a control variable and output as a steering angle such that the vehicle is positioned at a center of the lane in an automatic drive mode according to a given path, and controlling an actuator of an EPS system using the output.

6. A method for preventing lane deviation of a vehicle comprising:
    initializing variables and functions of a main ECU;
    checking information of a lane marker ECU and transmitting the information to an input data processor for processing of the information;
    determining driver intent to discontinue lane deviation prevention and determining whether lane deviation control can be performed;
    performing fail-safe control to determine whether a system for preventing lane deviation is malfunctioning in the case where there is no driver intent to discontinue lane deviation control and the vehicle is traveling in an area such that lane deviation control can be performed;
    determining if the vehicle is deviating from the lane based on information converted in an input data processor to suit an algorithm, in the case where it is determined that the system is operating normally;
    calculating an amount of steering control suitable to lane deviation conditions to generate a steering angle profile, in the case where it is determined that the vehicle is undergoing lane deviation;
    calculating a steering angle to return the vehicle to a center of the lane; and
    transmitting steering control data and steering angle data to an EPS system to realize steering control.

7. The method of claim 6 wherein processing of information by the input data processor includes conversion of input values of various sensors, a steering torque sensor, and of a transverse position of the vehicle.

8. The method of claim 6 wherein the driver intent is determined according to whether control switches have been operated, a brake pedal has been depressed, a steering wheel has been operated, and whether the vehicle is traveling in a no-service zone.

9. The method of claim 6 wherein the fail-safe control is performed by determining if a control steering angle is normal and determining if a present vehicle speed is less than or equal to a predetermined vehicle speed.

10. The method of claim 6 wherein the determination of whether the vehicle is deviating from the lane is performed by calculating a deviation prediction value according to vehicle speed using a transverse position of the vehicle and a heading angle value, which is the derivative of the transverse position.

11. The method of claim 10 wherein the prediction value (p_offset) is obtained by offset_f+Kw*slope_f, where offset_f is the transverse position of the vehicle, slope_f is the derivative of offset_f, and Kw is a gain, which varies according to vehicle speed, and if the p_offset value is greater than one of a predetermined deviation position value OFF_L(left) and a predetermined position value OFF_R (right), it is determined that the vehicle is deviating from the lane.

12. The method of claim 11 wherein the amount of steering control suitable to lane deviation conditions is calculated from inputs of vehicle speed and heading angle (slope_f) at the instant the deviation prediction value (p_offset) exceeds the predetermined deviation position value (OFF_L).

13. The method of claim 6 wherein the steering angle profile is realized through a triangular waveform.

14. The method of claim 6 wherein the steering angle is obtained from Kp*(offset_f−path)+Kd*slope_f, where Kp is P gain, Kd is D gain, offset_f is a transverse position of the vehicle, slope_f is a heading angle, and path is a desired path.

* * * * *